(12) United States Patent
Feldman et al.

(10) Patent No.: US 9,209,720 B2
(45) Date of Patent: Dec. 8, 2015

(54) ENERGY TRANSFER BETWEEN DATA STORAGE DEVICES WITH MOVING PARTS

(71) Applicant: Seagate Technology LLC, Cupertino, CA (US)

(72) Inventors: Timothy R. Feldman, Louisville, CO (US); John W. Shaw, Frederick, CO (US)

(73) Assignee: Seagate Technology LLC, Cupertino, CA (US)

( * ) Notice: Subject to any disclaimer, the term of this patent is extended or adjusted under 35 U.S.C. 154(b) by 142 days.

(21) Appl. No.: 14/034,779

(22) Filed: Sep. 24, 2013

(65) Prior Publication Data
US 2015/0084552 A1    Mar. 26, 2015

(51) Int. Cl.
H02P 3/14    (2006.01)
H02P 5/00    (2006.01)
H02P 31/00   (2006.01)

(52) U.S. Cl.
CPC .. H02P 5/00 (2013.01); H02P 3/14 (2013.01); H02P 31/00 (2013.01); H02P 2005/007 (2013.01)

(58) Field of Classification Search
USPC ............... 318/63, 400.34, 56, 57, 60, 86, 87, 318/400.1, 703, 757, 759, 258, 261, 269, 318/273, 255, 362, 375, 370, 5, 7, 625, 34, 318/51, 53, 38, 376, 400.31, 109; 363/72; 360/69, 75, 67, 61, 70, 73.03, 73.11, 360/73.14, 77.02, 77.03, 78.04, 78.13, 360/264.7, 266.4
See application file for complete search history.

(56) References Cited

U.S. PATENT DOCUMENTS

| | | | |
|---|---|---|---|
| 6,094,020 A | 7/2000 | Goretzki et al. | |
| 6,177,772 B1 | 1/2001 | Barua et al. | |
| 6,295,577 B1 | 9/2001 | Anderson et al. | |
| 6,516,426 B1* | 2/2003 | Forehand et al. | 714/24 |
| 6,865,049 B1* | 3/2005 | Codilian et al. | 360/71 |
| 6,940,675 B2 | 9/2005 | Hassan et al. | |
| 7,161,757 B1* | 1/2007 | Krishnamoorthy et al. | 360/69 |
| 7,529,055 B1 | 5/2009 | Laks et al. | |
| 2005/0218846 A1* | 10/2005 | Moser et al. | 318/376 |
| 2006/0038524 A1* | 2/2006 | Okamoto et al. | 318/625 |
| 2006/0066281 A1 | 3/2006 | Brenden et al. | |
| 2007/0023580 A1* | 2/2007 | Hart et al. | 244/165 |
| 2007/0026093 A1 | 2/2007 | Coates | |
| 2008/0079373 A1* | 4/2008 | Melfi | 318/63 |

* cited by examiner

*Primary Examiner* — Kawing Chan
*Assistant Examiner* — Jorge L Carrasquillo
(74) *Attorney, Agent, or Firm* — Westman, Champlin & Koehler, P.A.

(57) ABSTRACT

A system that includes a first data storage element actuated by a first electric motor. The system also includes a second data storage element actuated by a second electric motor. An electrical connector assembly transfers electrical energy from a back electromotive force generated in the first electric motor, by movement of the first data storage element, to the second electric motor to thereby energize the second electric motor.

20 Claims, 7 Drawing Sheets

ENERGY TRANSFER BETWEEN DATA STORAGE DEVICES WITH MOVING PARTS

BACKGROUND

Data storage/memory devices are one of many components of modern computers. Examples of data storage devices include hard disk drives (HDDs), which are electromechanical devices containing spinning discs and movable read/write heads, and hybrid drives, which combine features of HDDs and solid state drives (SSDs) with no moving parts in one unit. The disclosure is related to systems and methods of transferring energy between such data storage devices.

SUMMARY

In a particular embodiment, a system is disclosed that includes a first data storage element actuated by a first electric motor. The system also includes a second data storage element actuated by a second electric motor. An electrical connector assembly transfers electrical energy from a back electromotive force generated in the first electric motor, by movement of the first data storage element, to the second electric motor to thereby energize the second electric motor.

In another particular embodiment, a data storage device is disclosed that includes a housing. The data storage device also includes a moveable member actuated by an electric motor. The moveable member and the electric motor are within the housing. The data storage device also includes an electrical connector attached to the housing and electrically coupled to the electric motor. The electrical connector is configured to provide electrical energy from a back electromotive force generated in the electric motor, by movement of the first moveable member, to a device that is external to the housing.

In yet another particular embodiment, a method is disclosed that includes actuating a first moveable member by supplying power to a first electrical motor associated with the first moveable member. The method also includes stopping the power supplied to the first electric motor. The further includes, upon stopping the power supplied to the first electric motor, transferring electrical energy from a back electromotive force generated in the first electric motor, by movement of the first moveable member, to a second electric motor to energize the second electric motor.

DETAILED DESCRIPTION

In the following detailed description of the embodiments, reference is made to the accompanying drawings which form a part hereof, and in which are shown by way of illustration of specific embodiments. It is to be understood that other embodiments may be utilized and structural changes may be made without departing from the scope of the present disclosure.

The disclosure is related to systems and methods for transferring energy between data storage devices with moving parts. The systems and methods described herein are particularly useful for hard disk drives (HDDs) and hybrid drives, which combine features of HDDs and solid state drives (SSDs). However, the systems and methods described herein can be applied to other types of data storage systems that include one or more moving parts.

In some embodiments described further below, energy produced by slowing down of a spinning device within a data storage device is recovered, and the recovered energy is provided to another data storage device that includes one or more moving parts.

HDDs typically include a motor that spins a data storage medium (for example, a media disc) at a high speed so that data may be, for example, magnetically read or written to the media disc by a read-write head. A spindle or rotor of the motor holds the data storage medium. The motor rotates the spindle or the rotor, which spins the data storage medium. When power is removed from the operating motor, the rotor or spindle gradually spins to a stop and generates a back electromotive force (EMF) voltage over windings of the motor. The level of generated voltage may depend on the various properties of the spinning data storage medium. For example, the greater the speed of the spinning data storage medium when power is removed from the motor, the more back EMF voltage will be generated. In many HDDs, the back EMF voltage generated may not be fully utilized. This back EMF voltage may be wasted as heat energy or may be used within a device only in cases of emergency shutdown. Embodiments described below address such wastage of energy. One general embodiment for transferring energy between data storage devices with moving parts is described below in connection with FIG. 1.

Figure 1:
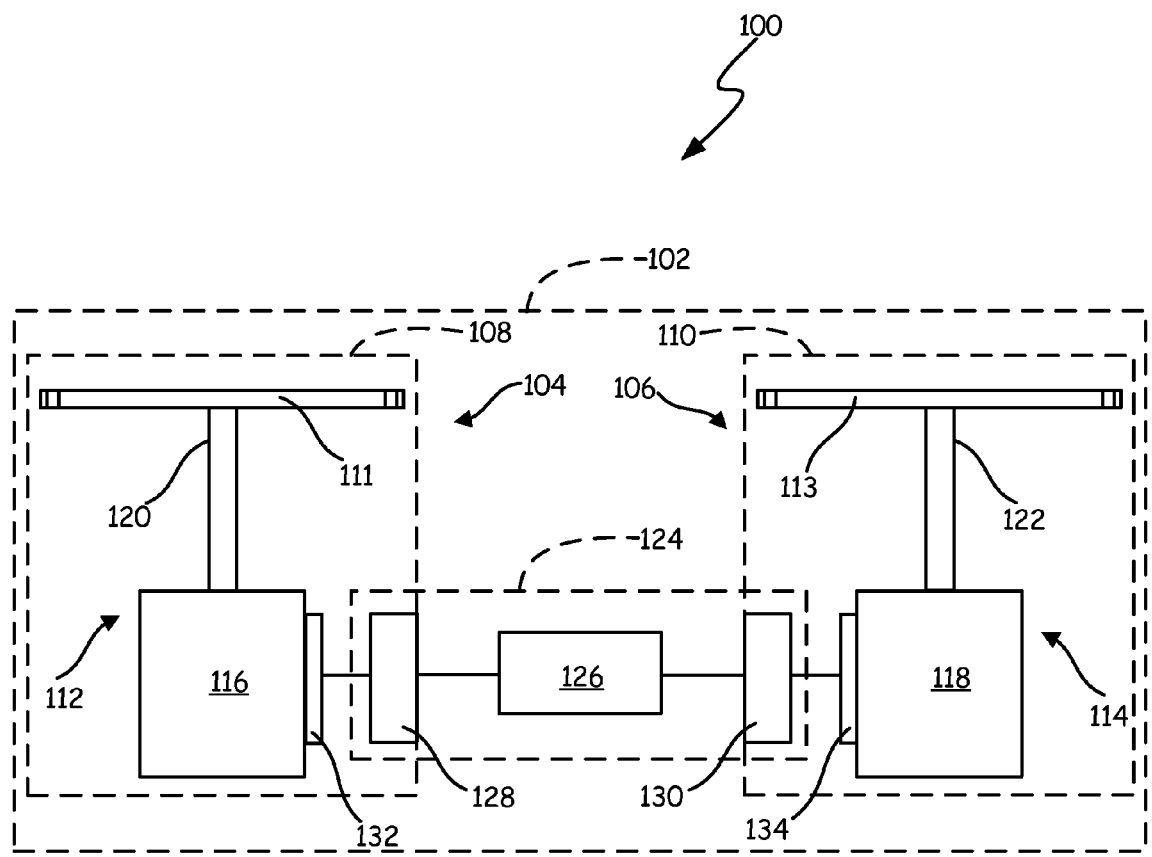
FIG. 1 is a simplified block diagram of a data storage system that includes a plurality of moveable members that are actuated by electric motors in accordance with one embodiment.

FIG. 1 is a simplified block diagram of a data storage system 100 that includes a plurality of moveable members (for example, moveable data storage elements such as media discs) that are actuated by electric motors in accordance with one embodiment. Data storage system 100 may include a housing 102 that includes multiple data storage devices such as 104 and 106. It should be noted that only two data storage devices 104 and 106 are shown in the interest of simplification. However, any suitable number of data storage devices may be used in different applications. For example, a business may include a data center that occupies a relatively large room, or even an entire building, with shelves of data storage systems for storage of business data. Each shelf in the data center may include a data storage system having a number of data storage devices (for example, 15 data storage devices) with only one data storage device spinning at a time. Energy is costly, and energy available to run such data centers may be limited. Transferring energy between data storage devices in a manner described below can help address such energy-related problems.

In system 100, each data storage device 104, 106 may include a housing 108, 110 that includes a data storage assembly 112, 114. Each data storage assembly 112, 114 includes an electric motor 116, 118 that includes a rotor or spindle 120, 122. A first end of rotor or spindle 120, 122 is internal to motor 116, 118 and a second end of rotor or spindle 120, 122 supports a data storage medium 111, 113. Each data storage device 104, 106 may include a motor control circuit 132, 134. Data storage system 100 also includes an electrical connector assembly 124 connected between motors 116 and 118. Electrical connector assembly 124 may include interface connectors 128 and 130, which are attached to housings 108 and 110, respectively. Electrical connector assembly 124 also includes an energy transfer controller 126 that is coupled between interface connectors 128 and 130.

In system 100, motor 116 rotates spindle 120, which spins data storage medium 111. Similarly, motor 118 rotates spindle 122, which spins data storage medium 113. Motor 116 receives power from a power source (not shown in FIG. 1) via interface connector 128 and motor 118 receives power from the power source via interface connector 130. Motor controllers 132 and 134 control spindle or rotor speed, motor spin-up and spin-down operations, etc., of motors 116 and 118, respectively. Also, electrical connector assembly 124 receives back EMF voltage generated in motors 116 and 118 from motor controllers 132 and 134, respectively. The back EMF voltage derived from motors 116 and 118 is routed to energy transfer controller 126 via interface connectors 128 and 130, respectively. Each of connectors 128 and 130 may include pins (not shown in FIG. 1) for the back EMF routing.

Electrical connector assembly 124 is configured to transfer electrical energy from a back EMF generated in any one of motors 116 and 118 to the other one of motors 116 and 118. For example, electrical connector assembly 124 is configured to transfer back EMF generated in electric motor 116, by movement of spindle 120, to electric motor 118 to energize electric motor 118. Electrical connector assembly 124 may also transfer electrical energy from a back EMF generated in electric motor 118, by movement of spindle 122, to electric motor 118 to energize the electric motor 116. In some embodiments, energy transfer controller 126 helps synchronize spin-up and spin-down events between devices 104 and 106 to ensure that energy from one of devices 104 and 106 that is spinning down is proved to the other one of devices 104 and 106 that is spinning up. Details regarding back EMF generation in a motor are provided below in connection with FIG. 2, and details regarding synchronization of spin up and spin down events to take advantage of possible energy transfer from generated back EMF are provided further below in connection with FIGS. 3, 4A, 4B and 4C.

Figure 2:
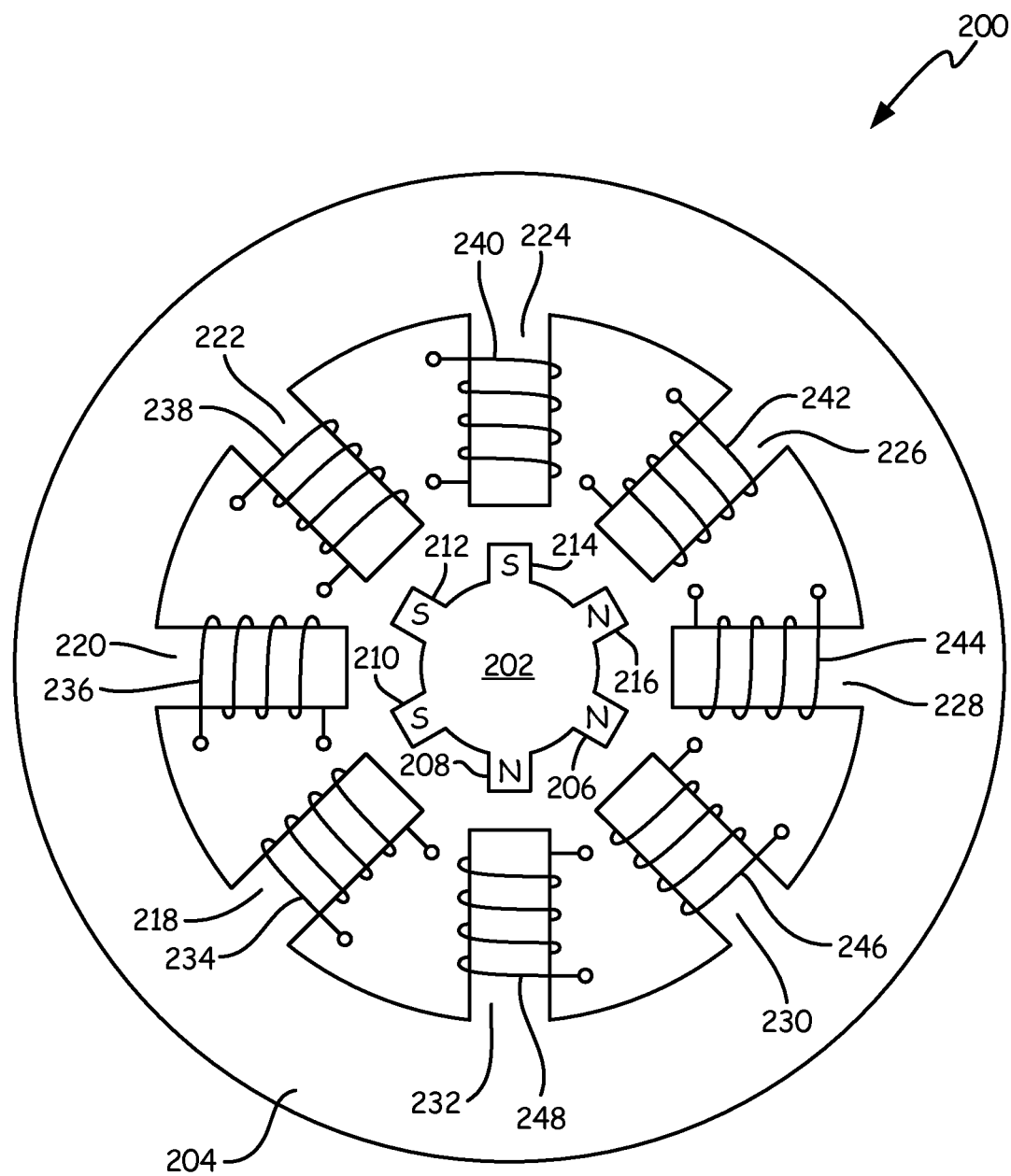
FIG. 2 shows a top view of a motor that may be employed in the data storage system of FIG. 1.

FIG. 2 shows a top view of a motor 200, which may be employed as motor 116 or 118 in data storage system 100 of FIG. 1. Motor 200 includes a rotor 202 in operative association with a stator 204. Rotor 202 has a plurality of teeth 206, 208, 210, 212, 214, and 216 which may be magnets that have a fixed north or south polarity. Stator 204 has a plurality of poles 218, 220, 222, 224, 226, 228, 230 and 232. On these poles are respective windings 234, 236, 238, 240, 242, 244, 246, and 248. Current flowing through the windings of a pole may make the polarity of the pole north or south. Furthermore, as the direction of current flowing through an individual winding changes, the polarity of the corresponding pole may also change from north to south and vice versa.

Magnets are attracted to other magnets with opposite polarities. Magnets with the same polarity repel each other. For example, tooth 216 may have a permanent north polarity. When pole 226 is of south polarity, tooth 216 is attracted to pole 226. When current in coil 242 is reversed, thereby changing the polarity of pole 226 from south to north polarity, tooth 216 is repelled from pole 226, thus causing tooth 216 to move away from pole 226. The teeth and poles shown in motor 200 may behave in a similar fashion and, when operated in a coordinated manner, may thus rotate rotor 202.

As noted above, a motor such as 200 is employed in a data storage system such as 100 to spin storage media such as 111 and 113. When power is provided to motor 200 employed in a data storage system 100, motor 200 spins rotor 202 and a disc such as 111, 113 so that data may be read from disc 111, 113. When a power supply stops powering motor 200, motor 200 may produce a back EMF voltage and a current, as described above, as motor 200 slows to a stop. The voltage generated by slowing motor 200 may be mathematically represented by Faraday's law:

$$V_{EMF} = -N\frac{d\phi}{dt} \quad \text{Equation 1}$$

In Equation 1, $V_{EMF}$ is an electromotive force (EMF) voltage, N is the number of turns in a coil of wire, and $\Phi$ is magnetic flux. Magnetic flux $\Phi$ is proportional to the lines of a magnetic field that surround a magnet multiplied by the perpendicular area that the magnetic field penetrates. Magnetic flux may be changing over time because the perpendicular area that the magnetic field penetrates may be changing. Thus, Equation 1 shows that when a changing magnetic flux $\Phi$ interacts with a coil of wire having N turns, a $V_{EMF}$ is produced equal to the rate of change of the magnetic flux multiplied by the number of turns multiplied by negative 1.

Thus, as each tooth that is a magnet with north or south polarity in rotor 202 rotates, the corresponding magnetic field associated with the tooth also rotates. The rotating magnetic field of each tooth passes over each winding so that a voltage, as given by Equation 1, is created across each winding.

Motor 200 may generate a direct current (DC) voltage by controlling the $V_{EMF}$ generation process using a control circuit such as 132, 134 of FIG. 1, which may couple to the windings of motor 200. The control circuit may continually reverse the direction of the current generated across the windings so that a DC voltage is produced. In some other embodiments, motor 200 may generate an alternating current (AC) voltage and an AC to DC converter within a control circuit such as 132, 134 of FIG. 1, for example, may convert the AC to DC. Thus, a device such as 104, 106 of FIG. 1 may output a DC voltage. It should be noted that the windings of motor 200 may couple together in parallel or series fashion.

Figure 3:
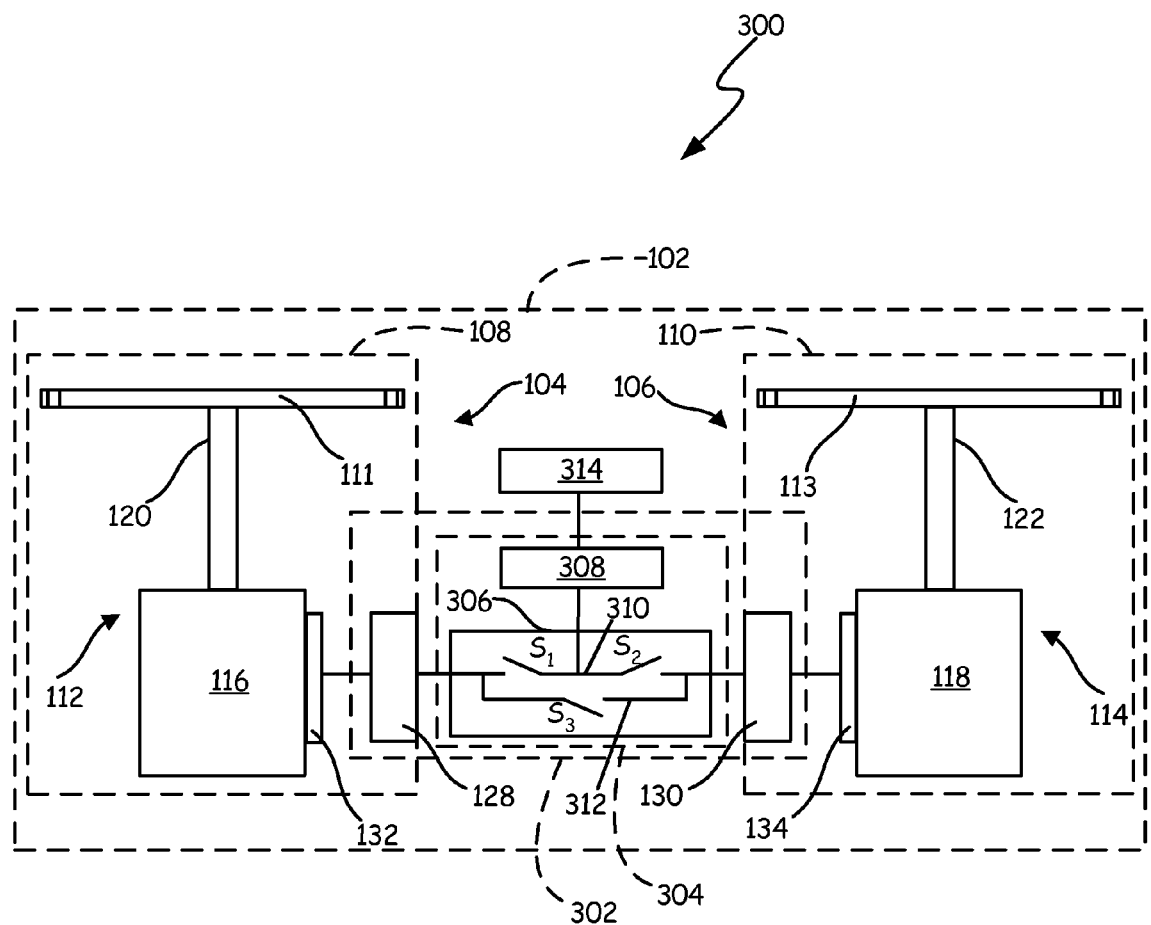
FIG. 3 is a simplified block diagram of another data storage system embodiment.

FIG. 3 is a simplified block diagram of a data storage system 300, which is similar to the data storage system 100 of FIG. 1. However, the embodiment of FIG. 3 shows details of an electrical connector assembly 302, which are not shown in FIG. 1. Elements in FIG. 3 that are similar to those included in FIG. 1 are numbered with the same reference numerals. Also, the description of the similar elements is not repeated in connection with FIG. 3.

As can be seen in FIG. 3, electrical connector assembly 302 includes an energy transfer controller 304 having a switching component 306 with multiple switches $S_1$, $S_2$ and $S_3$ and a synchronization component 308. As will be described further below, switches $S_1$ and $S_2$ are in a power supply path 310 and switch $S_3$ is in a back EMF path 312. Synchronization component 308 controls operation of switches $S_1$, $S_2$ and $S_3$. A power supply 314, which provides power to devices 104 and 106, is shown coupled to synchronization component 308.

As noted above, a shelf in a data center may include a data storage system having multiple data storage devices with only one data storage device spinning at a time. Data storage system 300 may be utilized in such a data center, and only one of devices 104 and 106 may spin at a time. At a particular point during operation of system 300, data storage medium 111 within device 104 may be spinning, and no moving parts, such as data storage medium 113, may be spinning within device 106. At this particular point in time, $S_1$ is in a closed position and $S_2$ and $S_2$ may be open.

Due to a command received in data storage system 300, for example, data stored on storage medium 113 may need to be accessed. Prior to carrying out the data access operation on storage medium 113, system 300 may first stop powering device 104. This may be carried out by synchronization component 308 opening switch $S_1$. Motor 116 may produce a back EMF voltage and a current as spindle 120 slows to a stop due to the opening of switch $S_1$. Power from back EMF produced in motor 116 may be provided to device 106 via back EMF path 312. This may be carried out by synchronization component 308 closing switch $S_3$ with switches $S_1$ and $S_2$ remaining open. It should been noted that the back EMF voltage may be boosted, by a power booster (not shown in FIG. 3), to a suitable level and provided to device 106 via a voltage regulator (not show in FIG. 3) and $S_3$. Of course, other than the power from the back EMF voltage, power from power supply 314 may be provided to device 106 by synchronization component 308 closing switch $S_2$.

As noted earlier in connection with the description of data storage system 100 (of FIG. 1), interface connectors 128 and 130 include pins to route back EMF generated within data storage devices 104 and 106, respectively, to energy transfer controller 126 that is external to device 104 and 106. In one embodiment, energy transfer controller 126 includes an energy storage reservoir that stores the back EMF energy received from devices 104 and 106. Such an embodiment is described below in connection with FIGS. 4A through 4C.

Figure 4A:
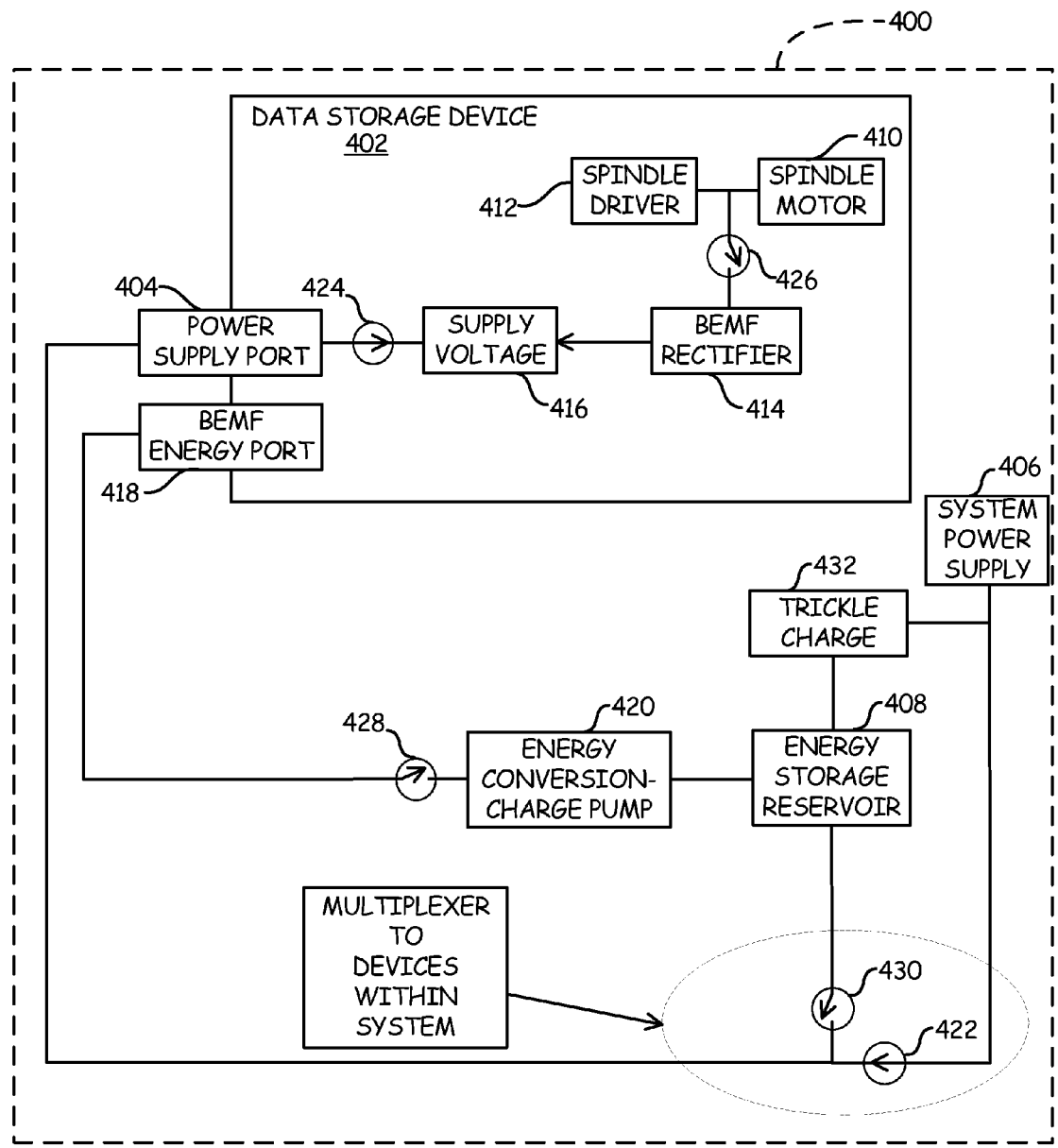
FIGS. 4A through 4C are simplified block diagrams that illustrate yet another data storage system embodiment.
Figure 4B:
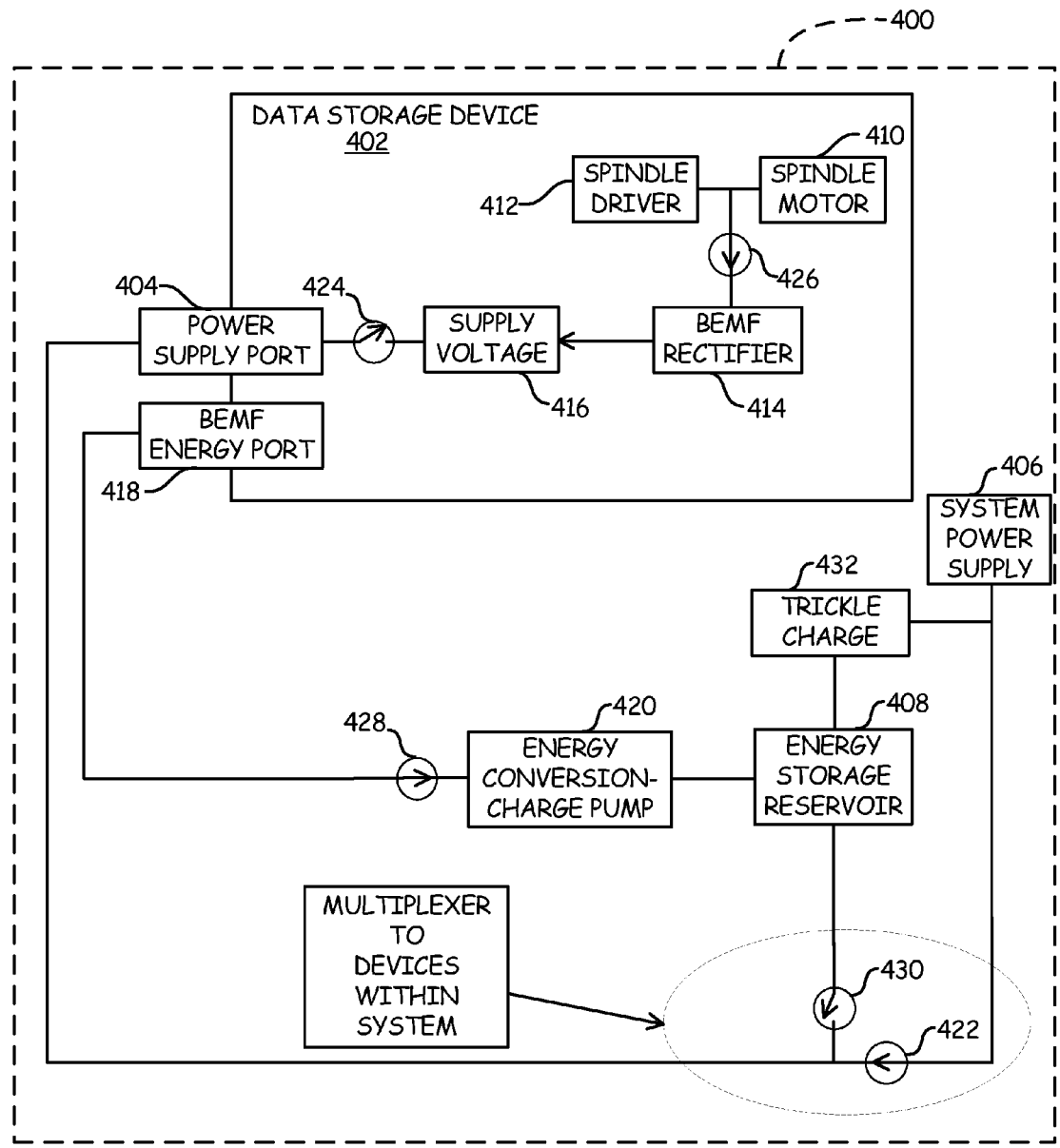
Figure 4C:
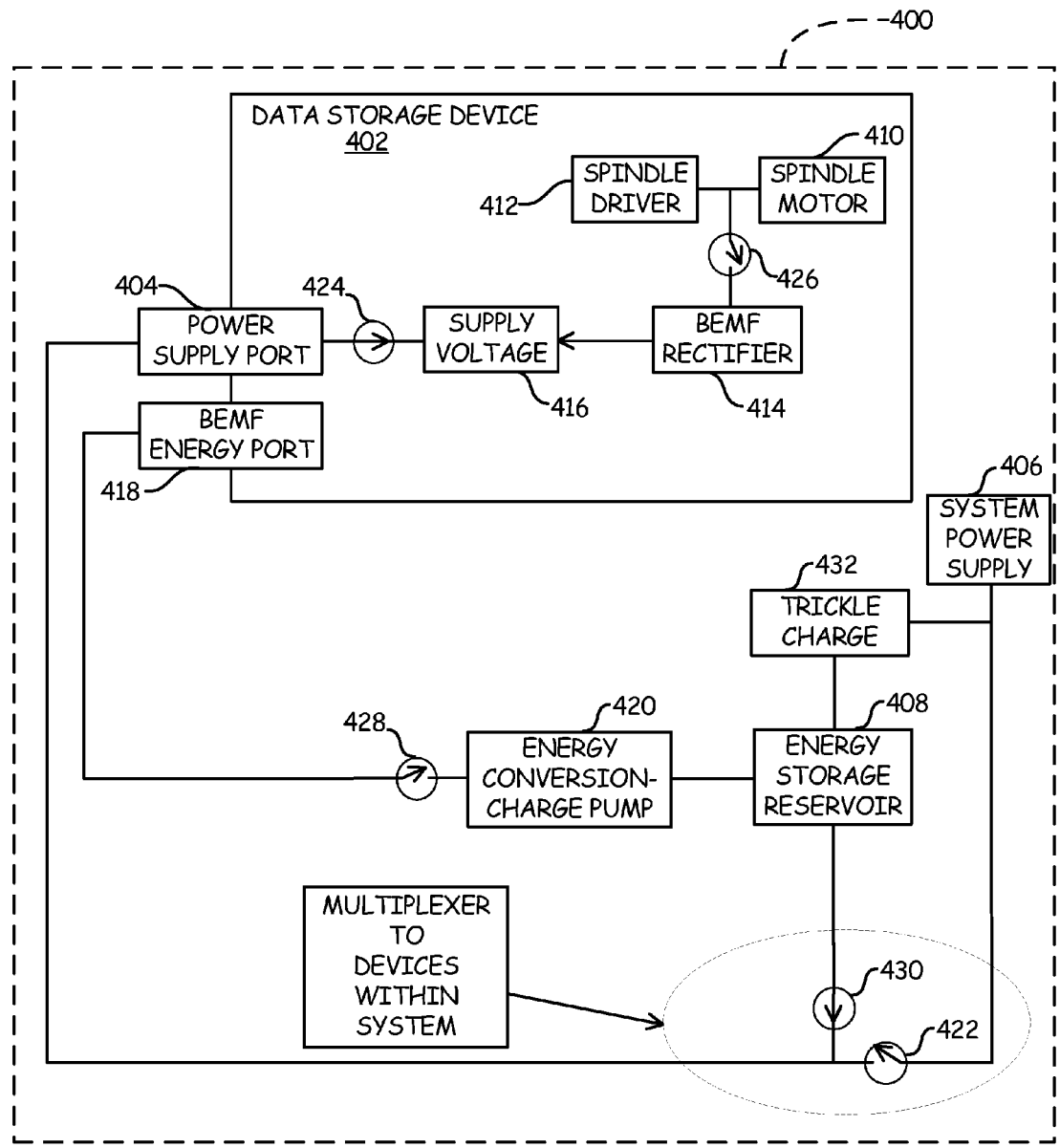

FIGS. 4A through 4C include a simplified block diagram of a data storage system 400, which is similar to data storage system 100 and 300 of FIGS. 1 and 3, respectively. As indicated above, data storage system 400 includes an energy storage reservoir that stores back EMF energy that it receives from data storage devices with moving parts. In the interest of simplification, only one data storage device 402 of data storage system 400 is shown in FIGS. 4A, 4B and 4C. As can be seen in FIGS. 4A, 4B and 4C, data storage device 402 receives power from external power sources via power supply port 404. The external power sources may include a system power supply 406 and an energy storage reservoir 408.

In one embodiment, data storage device 402 is a HDD. HDD includes a spindle motor 410 and a spindle drive 412 for operating spindle motor 410. HDD 402 also includes a back EMF (BEMF) rectifier 414. BEMF rectifier 414 is connected to internal-to-device isolated supply voltage circuitry 416 that may utilize a portion of back EMF energy from BEMF rectifier 414 within device 402 and provide a remaining portion of the back EMF energy to energy storage reservoir 408 via BEMF energy port 418. In certain embodiments, circuitry 416 provides all back EMF energy generated within device 402 to energy storage reservoir 408. In some embodiments, energy storage reservoir 408 includes one or more batteries. In other embodiments, energy storage reservoir 408 includes one or more capacitors. In still other embodiments, energy storage reservoir 408 includes a combination of different storage elements that may include batteries, capacitors and/or any other suitable energy storage elements.

An explained earlier, back EMF energy is a product of spindle speed. Thus, as the spindle speed decreases, so will the derived BEMF voltage. As such, at certain points in time, the derived BEMF voltage may be lower than a supply voltage level (for example, 12 Volts) necessary for a HDD to carry out operations such as a spin-up operation. Thus, in some embodiments, "special handling" of back EMF energy generated in one device may be needed before the generated back EMF energy is transferred for use in a different device. The "special handling" is carried out by employing a charge pump circuit that is configured to create voltages that are high enough to facilitate adequate energy storage charge current, or configured to be used as a regulated power supply. In the embodiment shown in FIGS. 4A, 4B and 4C, the back EMF output by device 402 is input to energy conversion charge pump 420, which provides its output to energy storage reservoir 408. As will be described below, with a series of switches (for example, switches 422-430) energy storage reservoir 408 may be: 1) isolated from power supplies connected to HDD 402, 2) charged by captured back EMF energy from HDD 402, 3) "trickle" charged by system power supply 406 via trickle charge circuitry 432, and 4) exclusively switched into a next successive HDD power supply for spin-up of the next HDD.

FIG. 4A depicts HHD 402 in an "active" or "spinning" mode during which read/write operations, for example, are being carried on within HDD 402. In this operating mode, switches 422 and 424 are closed and switches 426, 428 and 430 are open. Since switches 422 and 424 are closed and switch 430 is open, HDD 402 receives power from only system power supply 406 during the active mode of operation. Also, due to switches 426 and 428 being open during the active mode of operation, no back EMF energy is obtained from spindle motor 410 and provided to energy storage reservoir 408.

FIG. 4B depicts HDD 402 in a "commanded OFF" or "spin-down" mode which can occur after a read/writer operation is completed in HDD 402. HDD 402 enters this mode immediately after it is commanded to turn OFF, for example. In this mode, switches 424 and 430 are open and switches 426, 428 and 430 are closed. Since switch 426 is closed, back EMF energy generated by spindle motor 410 is received by BEMF rectifier 414 that, for example, converts an alternating current into a direct one by allowing a current to flow through it in one direction only. A rectified back EMF output from component 414 is provided to voltage supply circuitry 416, which provides at least some of the received back EMF energy to energy conversion charge pump 420. Energy conversion charge pump 420 may convert an input back EMF voltage having a first voltage level to, for example, a higher second voltage level and provide an output at the second voltage level to energy storage reservoir 408. This prevents wastage of back EMF energy produced during spin down of HDD 402.

FIG. 4C depicts HHD 402 in a "command active" or "spin-up" mode during which a spindle within motor 410 spins up from a stationary condition. In this mode, switches 422, 426 and 428 are open and switches 424, and 430 are closed. Thus, in this mode, the spin up operation is carried out in HDD 402 with the help of power from energy storage reservoir 408. It should be noted that switches 422 and 430 may be a part of a multiplexer that selectively couples system power supply 406 and/or energy storage reservoir 408 to different individual ones of a plurality of HDDs within data storage system 400. In some embodiments, one or more of switches 422-430 may comprise isolation Field Effect Transistors (FETs). A synchronization component similar to component 308 described in connection with FIG. 3 may be used to synchronize opening and closing of different ones of switches 422-430. In the embodiment of FIGS. 4A, 4B and 4C, elements 404, 408, 418 420, 422 428 and 432 and with a synchronization component (not shown in FIGS. 4A, 4B and 4C) form a connector assembly for system 400. In some embodiments, a single connector such as 128, 130 (of FIGS. 1 and 3) may be used instead of separate ports 404 and 418 for power and back EMF energy because power and back EMF are received in/provided from HDD 402 at different times during operation of HDD 402, thereby enabling a same connector to be shared.

Figure 5:
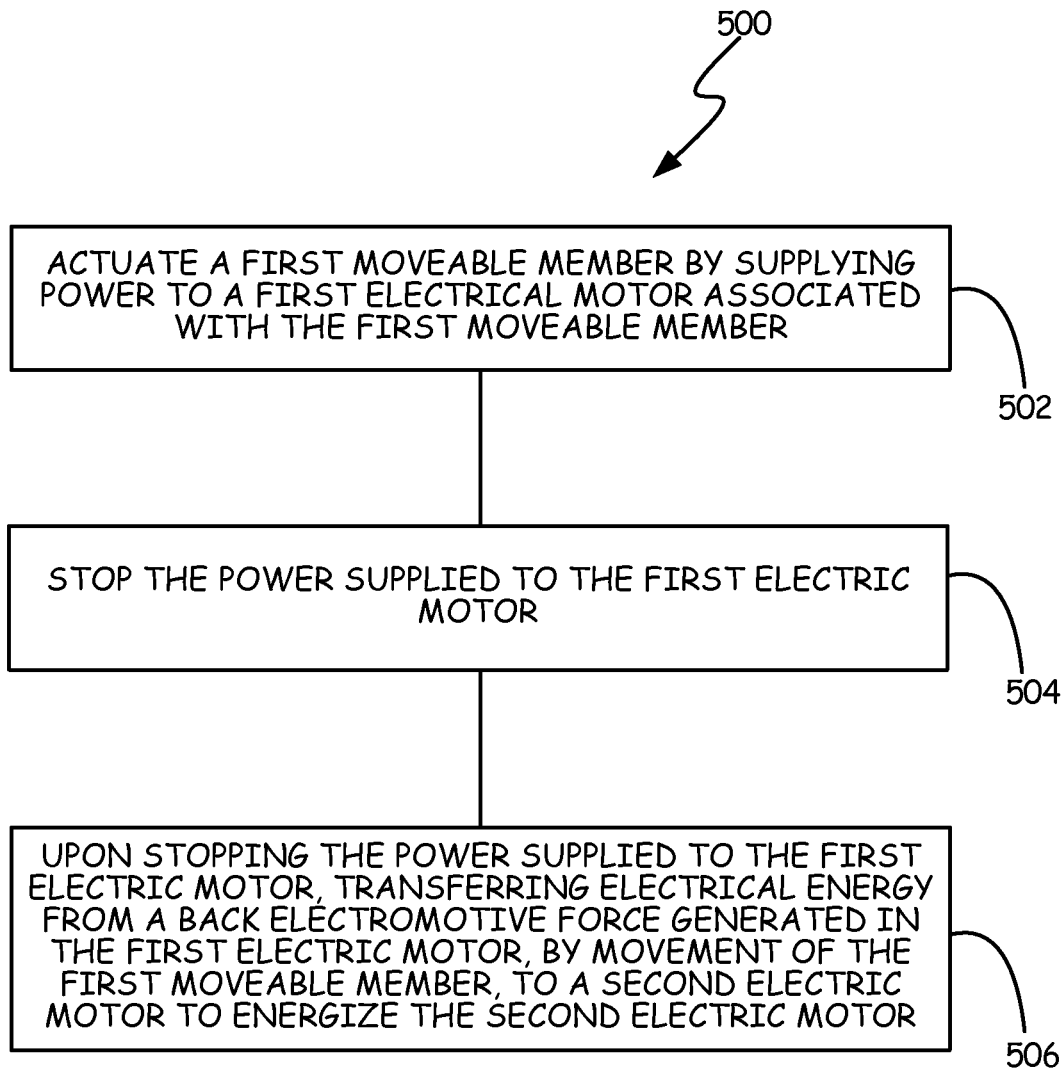
FIG. 5 is a flow diagram of a method embodiment.

Referring to FIG. 5, a very simplified flow diagram of a particular illustrative embodiment of a method of transferring back EMF from a first electrical motor to a second electric motor is shown and generally designated 500. The method 500 may be implemented by components shown in data storage systems 100, 300 and 400. The method 500 may include actuating a first moveable member by supplying power to a first electrical motor associated with the first moveable member, at 502. The method may then include stopping the power supplied to the first electric motor, at 504. The method may further include, upon stopping the power supplied to the first electric motor, transferring electrical energy from a back electromotive force generated in the first electric motor, by movement of the first moveable member, to a second electric motor to energize the second electric motor, at 506.

In accordance with various embodiments, the methods described herein may be implemented by instructions or code executed by one or more components shown in data storage systems 100, 300 and 400. Dedicated hardware implementations including, but not limited to, application specific integrated circuits, programmable logic arrays and other hardware devices can likewise be constructed to implement the methods described herein.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A system comprising:
   a first data storage medium actuated by a first electric motor;
   a second data storage medium actuated by a second electric motor; and
   an electrical connector assembly comprising an energy transfer controller, the energy transfer controller comprising:
      a switching component having at least one power supply switch included in a power supply path from a system power supply to the first electric motor and at least one back electromotive force switch included in a back electromotive force path;
      a synchronization component that controls operation of the at least one power supply switch and the at least one back electromotive force switch, the synchronization component configured to:
         open the at least one power supply switch in the power supply path from the system power supply to the first electric motor to thereby substantially stop actuation of the first data storage medium by the first electric motor; and
         upon opening the at least one power supply switch, close the at least one back electromotive switch in the back electromotive force path to transfer electrical energy from a back electromotive force generated in the first electric motor by movement of the first data storage medium to the second electric motor to thereby energize the second electric motor.

2. The system of claim 1 and wherein the electrical connector assembly comprises an energy conversion charge pump.

3. The system of claim 1 and wherein the connector assembly comprises an energy storage reservoir.

4. The system of claim 3 and wherein the energy storage reservoir is configured to receive at least some of the back electromotive force generated by the first electric motor.

5. The system of claim 4 and wherein the energy storage reservoir is configured to receive the at least some of the back electromotive force generated by the first electric motor via an energy conversion charge pump.

6. The system of claim 3 and wherein the energy storage reservoir comprises at least one of a battery or a capacitor.

7. The system of claim 3 and further comprising circuitry, connected to the system power supply, configured to charge the energy storage reservoir.

8. The system of claim 1 and wherein the electrical connector assembly is configured to transfer electrical energy from the back electromotive force generated during spin down of the first electric motor to the second electric motor to energize the second electric motor during a spin up operation of the second electric motor.

9. The system of claim 1 and further comprising at least one back electromotive force rectification circuit.

10. The system of claim 1 and wherein the at least one power supply switch or the at least one back electromotive force switch comprises an isolation field effect transistor.

11. A system comprising:
at least one data storage device comprising:
a data storage element actuated by an electric motor; and
an electrical connector electrically coupled to the electric motor;
an energy storage reservoir external to the data storage device and coupled to the electrical connector via a back electromotive force path;
a multiplexer configured to selectively electrically couple at least one of the energy storage reservoir or a system power supply to the electrical connector via a power supply path; and
a synchronization component that controls operation of the back electromotive force path and the multiplexer, the synchronization component configured to:
control the multiplexer to open an electrical connection that provides power to the electric motor via the system power supply;
upon opening of the electrical connection that provides power to the electric motor, enable the back electromotive force path to allow transfer of electrical energy from a back electromotive force generated in the electric motor by movement of the data storage element to the energy storage reservoir;
control the multiplexer to electrically connect the energy storage reservoir to the electrical connector via the power supply path to power the electric motor; and
inhibit transfer of electrical energy from the data storage device to the energy storage reservoir via the back electromotive path when the electric motor is being powered by the energy storage reservoir.

12. The data storage device of claim 11 and further comprising a back electromotive force rectification circuit coupled between the electric motor and the electric connector.

13. The data storage device of claim 12 and further comprising at least one switch coupled between the electric motor and the back electromotive force rectification circuit.

14. The data storage device of claim 13 and wherein the at least one switch comprises an isolation field effect transistor.

15. The data storage device of claim 11 and wherein the electrical connector comprises common connector pins that serve as both power supply pins and pins for transferring the electrical energy from the back electromotive force generated in the electric motor.

16. A method comprising:
actuating a first data storage medium by supplying power to a first electric motor associated with the first data storage medium;
stopping the power supplied to the first electric motor by opening a power supply switch in a power supply path from a system power supply to the first electric motor;
upon stopping the power supplied to the first electric motor, closing a back electromotive switch in a back electromotive force path to transfer electrical energy from a back electromotive force generated in the first electric motor, by movement of the first data storage medium, to a second electric motor to energize the second electric motor to actuate a second data storage medium;
supplying power from the system power supply to the second electric motor by closing a power supply switch in a power supply path from the system power supply to the second electric motor;
stopping the power supplied to the second electric motor by opening the power supply switch in the power supply path from the system power supply to the second electric motor; and
upon stopping the power supplied to the second electric motor, closing the back electromotive switch in the back electromotive force path to transfer electrical energy from a back electromotive force generated in the second electric motor, by movement of the second data storage medium, to the first electric motor to energize the first electric motor to actuate the first data storage medium.

17. The method of claim 16 and further comprising storing at least some of the electrical energy from the back electromotive force generated in the first electric motor in an energy storage reservoir prior to transferring in the electrical energy to the second electric motor.

18. The method of claim 17 and further comprising boosting a voltage level of the at least some of the electrical energy prior to storing the electrical energy in the energy storage reservoir.

19. The method of claim 16 and further comprising spinning up the second electric motor using the transferred electrical energy.

20. The method of claim 16 and further comprising carrying out a spin up of the second electric motor when the power supply switch in the power supply path from the system power supply to the second electric motor is open.

* * * * *